(12) United States Patent
Kim

(10) Patent No.: US 8,974,310 B2
(45) Date of Patent: Mar. 10, 2015

(54) INTERMEDIATE SHAFT OF VEHICLE STEERING APPARATUS

(71) Applicant: Mando Corporation, Pyeongtaek-si, Gyeonggi-do (KR)

(72) Inventor: Dong Keun Kim, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 13/853,594

(22) Filed: Mar. 29, 2013

(65) Prior Publication Data

US 2013/0260903 A1 Oct. 3, 2013

(30) Foreign Application Priority Data

Mar. 29, 2012 (KR) .................. 10-2012-0032164

(51) Int. Cl.
| | |
|---|---|
| *F16D 3/84* | (2006.01) |
| *F16C 1/04* | (2006.01) |
| *B62D 1/16* | (2006.01) |
| *B62D 1/20* | (2006.01) |

(52) U.S. Cl.
CPC ... *F16C 1/04* (2013.01); *B62D 1/16* (2013.01); *B62D 1/20* (2013.01)
USPC .................. 464/17; 464/178; 74/492

(58) Field of Classification Search
USPC ............ 464/17, 170, 172, 178, 173; 180/380; 74/492, 609; 280/159, 777, 779, 847; 277/544, 552, 928

See application file for complete search history.

(56) References Cited

U.S. PATENT DOCUMENTS

| | | | | |
|---|---|---|---|---|
| 1,862,099 | A * | 6/1932 | Sheldrick | 180/380 |
| 2,409,062 | A * | 10/1946 | Oliver | 74/492 X |
| 3,482,653 | A * | 12/1969 | Yoshihiro et al. | 74/492 X |
| 4,324,533 | A * | 4/1982 | Schroeder et al. | 464/170 X |
| 4,433,846 | A * | 2/1984 | Romero et al. | 277/552 X |
| 6,203,440 | B1 * | 3/2001 | Bondioli | 464/173 |

FOREIGN PATENT DOCUMENTS

DE 19906411 A1 8/2000

OTHER PUBLICATIONS

Universal Joint and Driveshaft Design Manual, AE-7, Society of Automotive Engineers, Inc., Warrendale, PA, pp. 209-211, TJ1079. S62 1979.*

* cited by examiner

*Primary Examiner* — Gregory Binda
(74) *Attorney, Agent, or Firm* — McDermott Will & Emery LLP

(57) ABSTRACT

An intermediate shaft of a vehicle steering apparatus can prevent foreign matter, for example, moisture, dust or oil, from being introduced into the intermediate shaft even from a process of transporting the intermediate shaft to assemble it to a vehicle, and even when the intermediate shaft is assembled to the vehicle and the vehicle is driven. As a result, it is possible to prevent a component of the intermediate shaft from being deformed or damaged.

10 Claims, 4 Drawing Sheets

INTERMEDIATE SHAFT OF VEHICLE STEERING APPARATUS

CROSS-REFERENCE TO RELATED APPLICATION

This application claims priority from and the benefit under 35 U.S.C.§119(a) of Korean Patent Application No. 10-2012-0032164, filed on Mar. 29, 2012, which is hereby incorporated by reference for all purposes as if fully set forth herein.

BACKGROUND OF THE INVENTION

1. Field of the Invention

The present invention relates to an intermediate shaft of a vehicle steering apparatus. More particularly, the present invention relates to an intermediate shaft of a vehicle steering apparatus that is capable of preventing foreign matter, for example, moisture, dust and oil, from being introduced into the intermediate shaft even from a process of transporting the intermediate shaft to assemble it to a vehicle, and even when the intermediate shaft is assembled to the vehicle and the vehicle is driven, so that a component of the intermediate shaft can be prevented from being deformed or damaged.

2. Description of the Prior Art

As generally known in the art, a vehicle steering apparatus is configured such that when a driver rotates a steering wheel in a desired direction, a steering shaft connected to the steering wheel is rotated, and an intermediate shaft transmits the rotatory force of the steering shaft to a gear box, which includes a rack and pinion gear, through a universal joint.

In that event, the gear box converts the rotational motion of the steering shaft into a rectilinear motion by the rack and pinion gear, and transmits the rectilinear motion to a rack bar. The rack bar transmits the force to a tie rod connected to a tire knuckle such that the driving direction of the vehicle can be changed.

In particular, the axis between steering shaft and the gear box is configured by an input shaft and an output shaft which are angled to each other rather than being coaxially aligned, which makes it difficult to transmit power with a conventional shaft coupling method. Therefore, it is essential to employ an intermediate shaft and a universal joint so as to make the angle of the steering shaft variable within a predetermined range.

FIG. 1 is a schematic view of a vehicle steering apparatus that employs a conventional intermediate shaft.

As illustrated in FIG. 1, in a conventional vehicle steering apparatus, the lower end of a steering shaft 130 is connected with a gear box 180. However, because the steering shaft 130 is adapted to be connected with the gear box 180 in a state where the steering shaft 130 is inclined by a predetermined angle due to the circumstances thereof, an intermediate shaft 100 is used to meet with such a condition.

Here, the term, "intermediate shaft," is used to collectively refer to a member configured by, for example, a universal joint 110, an outer member 122, and an inner member 124 to transmit a rotatory force even in a state where it is curved by a predetermined angle.

The intermediate shaft 100 is an apparatus that is connected, at one end thereof, to the steering shaft 130 joined with a steering wheel 170, and, at the other end, to the gear box 180 such that the rotatory force produced in the steering wheel 170 can be transmitted to vehicle wheels through the gear box 180.

A steering column 150 includes an outer tube 145, an inner tube 140, and a mounting bracket 160. The outer tube 145 is formed in the steering wheel 170 side, and the inner tube is provided in the outer tube 145. Because the inner tube 140 has a diameter smaller than that of the outer tube 145, the inner tube 140 can be introduced into the outer tube 145 when an impact is applied thereto. Because each of the outer tube 145 and the inner tube 140 is formed in a hollow tube type, the steering shaft 130 can be smoothly rotated.

In order for the intermediate shaft 100 to be capable of transmitting the rotatory force even in a state where it is curved by a predetermined angle, the universal joint 110 is mounted at each end of the intermediate shaft 100 such that the rotatory force transmitted from one universal joint 110 mounted at one end can be transmitted to the other universal joint 110.

However, such a conventional intermediate shaft of a vehicle steering apparatus has a problem in that foreign matter, for example, moisture, dust and oil, is introduced into the inside of the intermediate shaft not only in the process of transporting the intermediate shaft to assemble it to a vehicle but also even when the intermediate shaft is assembled to the vehicle and the vehicle is driven, thereby causing a component to be deformed or damaged.

In addition, the deformation and damage of the intermediate shaft may be led to inability of steering or poor steering while the vehicle is being driven. As a result, a fatal problem may occur that causes a safety accident.

SUMMARY OF THE INVENTION

Accordingly, the present invention has been made to solve the above-mentioned problems occurring in the prior art, and an object of the present invention is to provide an intermediate shaft of a vehicle steering apparatus that is capable of preventing foreign matter, for example, moisture, dust or oil, from being introduced into the intermediate shaft even from a process of transporting the intermediate shaft to assemble it to a vehicle, and even when the intermediate shaft is assembled to the vehicle and the vehicle is driven, so that a component of the intermediate shaft can be prevented from being deformed or damaged.

In order to accomplish this object, there is provided an intermediate shaft of a vehicle steering apparatus. The intermediate shaft includes: a hollow outer member fixed to a vehicle body; an inner member inserted into the outer member, each end of the inner member being rotatably connected with a steering shaft through a universal joint; and an introduction prevention member coupled to an end of the outer member so as to prevent the introduction of foreign matter from the outside.

According to the present invention as described above, an intermediate shaft of a vehicle steering apparatus is capable of preventing foreign matter, such as moisture, dust or oil, from being introduced into the intermediate shaft even from a process of transporting the intermediate shaft to assemble it to a vehicle, and even when the intermediate shaft is assembled to the vehicle and the vehicle is driven. Accordingly, it is possible to prevent a component of the intermediate shaft from being deformed or damaged.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
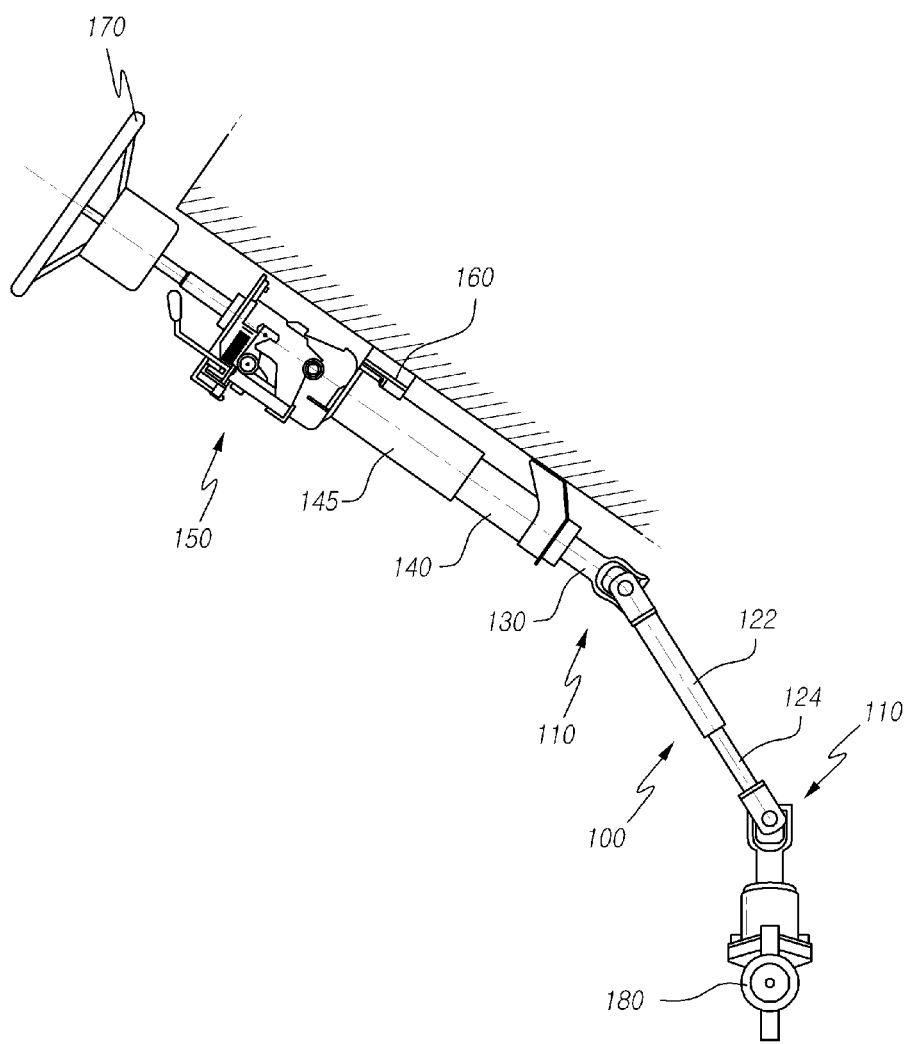
FIG. 1 is a schematic view illustrating a vehicle steering apparatus using a conventional intermediate shaft.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
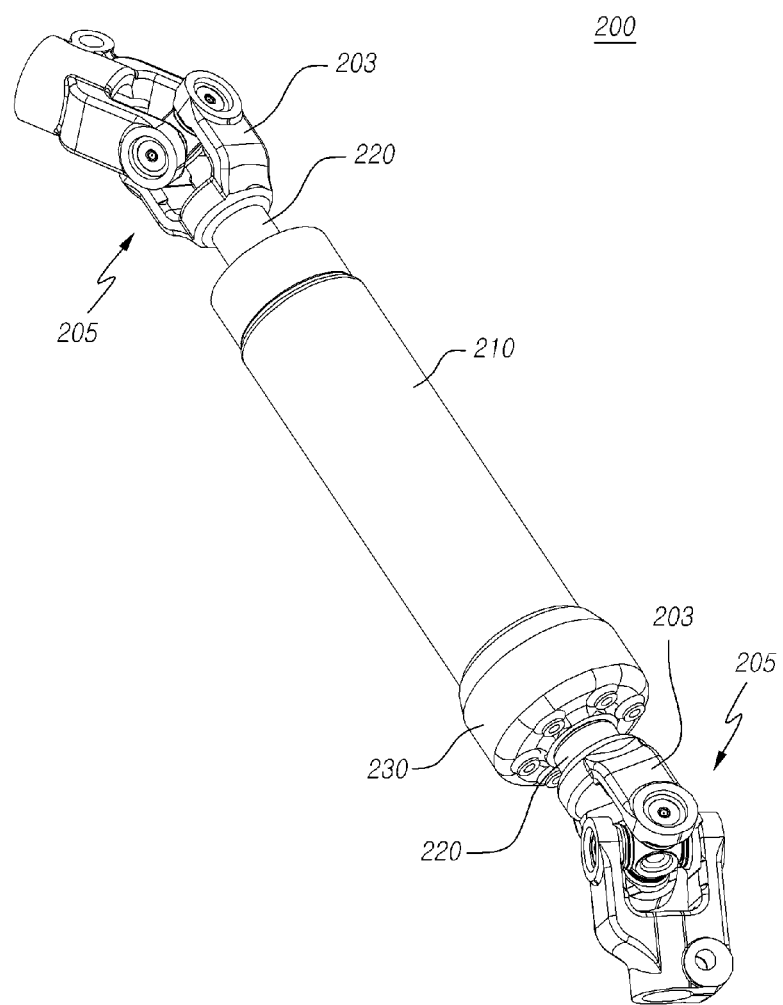
FIG. 2 is a perspective view illustrating an intermediate shaft vehicle steering apparatus according to an exemplary embodiment of the present invention.
Figure 3:
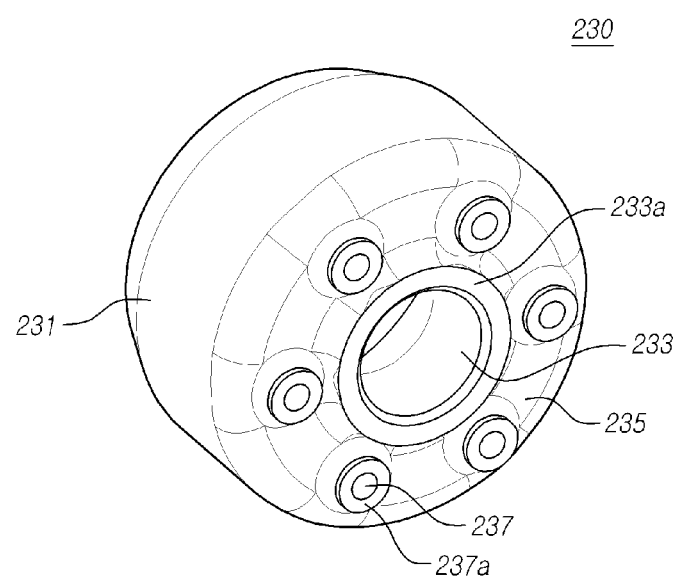
FIG. 3 is a perspective view illustrating an introduction prevention member in the intermediate shaft vehicle steering apparatus according to the exemplary embodiment of the present invention.
Figure 4:
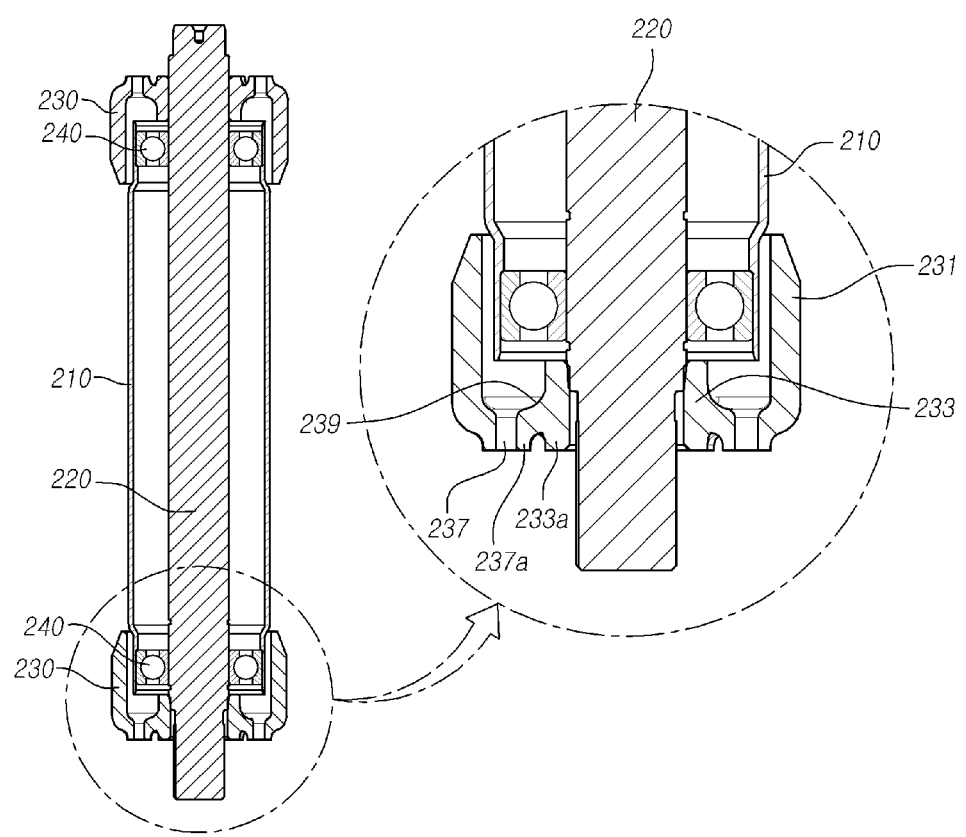
FIG. 4 is a cross-sectional view of the intermediate shaft vehicle steering apparatus according to the exemplary embodiment of the present invention.

FIG. 2 is a perspective view illustrating an intermediate shaft vehicle steering apparatus according to an exemplary embodiment of the present invention, FIG. 3 is a perspective view illustrating an introduction prevention member in the intermediate shaft vehicle steering apparatus according to the exemplary embodiment of the present invention, and FIG. 4 is a cross-sectional view of the intermediate shaft vehicle steering apparatus according to the exemplary embodiment of the present invention.

As illustrated in these drawings, the inventive intermediate shaft 200 of a vehicle steering apparatus includes: a hollow outer member 210 fixed to a vehicle body; an inner member 220 inserted in the outer member 210, each end of the inner member 220 being rotatably connected to a steering shaft (see reference numeral 130 in FIG. 1) through a universal joint 205; and an introduction prevention member 230 connected to an end of the outer member 210 so as to prevent the introduction of foreign matter from the outside.

The intermediate shaft 200 serves to transmit a rotatory force when a driver operates a steering wheel. When the intermediate shaft 200 is assembled to a vehicle, the lower end of the steering shaft (see reference numeral 130 in FIG. 1) is connected to a gear box (see reference numeral 180 in FIG. 1) in a state where it is curved by a predetermined angle through the universal joint 205. As a result, the intermediate shaft 200 can transmit the rotatory force produced in the steering wheel to vehicle wheels through the gear box 180.

The outer member 210 is a hollow member, such as a pipe, and a bracket (not illustrated) is coupled to the outer circumferential surface and fixed to the vehicle body. The inner member 220 is configured to be inserted into the inside of the outer member 210.

The inner member 220 has a shape of a solid shaft. At each end, the inner member 220 is provided with a yoke 203 and connected with a steering shaft though the universal joint 205. Each end of the outer member 210 is rotatably supported by a bearing 240.

An introduction prevention member 230 is coupled to an end of the outer member 210. The introduction prevention member 230 may be coupled to one end of the outer member 210 as illustrated in FIG. 2, or to each end of the outer member 210 as illustrated in FIG. 4.

That is, depending on whether the ends of outer member 210 are positioned in the interior side or exterior side with reference to a dash panel of the vehicle body, the introduction prevention member 230 may be coupled to one or each of the ends of the outer member 210.

The introduction prevention member 230 includes in general a large diameter part 231, a small diameter part 233, and a connection unit 235. The large diameter part 231 is coupled to the outer circumferential surface of the outer member 210, and the connection unit 235 extends diametrically inwardly from the large diameter part 231 and wraps an end of the outer member 210. The small diameter part 233 extends through the center of the connection unit 235 and is coupled to the outer circumferential surface of the inner member 220.

In addition, the small diameter part 233 is formed with a protrusion 233a at an end thereof. The protrusion 233a is formed in the circumferential direction of the small diameter part 233 and protrudes in the axial direction of the small diameter part 233, so as to prevent foreign matter, for example, moisture, dust and oil, from being introduced into the small diameter part 233.

The introduction prevention member 230 is formed with one or more through-holes 237 that extend axially through the connection unit 235. The through-holes 237 are spaced apart from each other with a predetermined interval in the circumferential direction of the introduction prevention member 230 such that foreign matter introduced into the introduction prevention member 230 along the outer circumferential surface or ends of the outer member 210 are discharged to the outside through the through-holes 237.

The end of each of the through-holes 237 is formed with a protrusion 237a formed in the circumferential direction of the corresponding through-hole 237 and protruding in the axial direction of the through-hole 237. Accordingly, the foreign matter may be discharged to the outside through the through-holes 237. However, the foreign matter is not easily introduced into the introduction prevention member 230 through the through-holes 237.

Meanwhile, a discharge slot 239 is formed in an inside of the connection unit 235 as a circumferential recess to be communicated with the through-holes 237. The discharge slot 239 is formed to extend from a connection area between the large diameter part 231 and the connection unit 235 and to a position spaced apart from the small diameter part 233 by a predetermined distance such that the foreign matter introduced into the introduction prevention member 230 along the outer circumferential surface or ends of the outer member 210 may be collected into the discharge slot along the inner circumferential surface of the introduction prevention member 230 and discharged to the outside through the through-holes 237.

It is requested that the introduction prevention member 230 be formed from a material that is excellent in wear resistance and antifriction, has predetermined flexural strength and rigidity, and is less extendible by heat. Subsequently, the introduction prevention member 230 may be formed from an engineering plastic class material, for example, polyacetal (POM), polyamide (PA), polycarbonate (PC), polyimide (PI) and polybutylene terephthalate (PBT), or a synthetic resin, or an elastic material, for example, natural rubber (NR), nitrile butadiene rubber (NBR), chloroprene rubber (CR), ethylene propylene rubber (EPDM), fluoro rubber (FPM), styrene butadine rubber (SBR), and chlorosulphonated pPolyethylene (CSM). These materials have the properties required for the introduction prevention member 230.

According to the present invention as described above, the intermediate shaft of a vehicle steering apparatus is capable of preventing foreign matter, such as moisture, dust or oil, from being introduced into the intermediate shaft even from a process of transporting the intermediate shaft to assemble it to a vehicle, and even when the intermediate shaft is assembled to the vehicle and the vehicle is driven. Accordingly, it is possible to prevent a component of the intermediate shaft from being deformed or damaged.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An intermediate shaft of a vehicle steering apparatus, comprising:
    a hollow outer member;
    an inner member inserted into the outer member, each end of the inner member being connected with a steering shaft through a universal joint to be rotated; and
    an introduction prevention member coupled to an end of the outer member and covering at least a portion of an outer circumferential surface of the outer member,
    wherein the introduction prevention member is formed with an opening extending in an axial direction of the introduction prevention member, said inner member inserted into the opening,
    wherein the introduction prevention member is formed with one or more through-holes extending in the axial direction and spaced apart from the opening in a radial direction of the introduction prevention member, and
    wherein an inner circumferential surface of the introduction prevention member is spaced apart from the outer circumferential surface of the outer member to define a passage therebetween which communicates with the one or more through-holes.

2. The intermediate shaft of claim 1, wherein the introduction prevention member comprises a large diameter part covering the portion of the outer circumferential surface of the outer member, a connection unit extending diametrically inward from the large diameter part, and a small diameter part extending through a center of the connection unit and coupled to an outer circumferential surface of the inner member.

3. The intermediate shaft of claim 2, wherein the introduction prevention member is formed with a protrusion that is formed in a circumferential direction of the introduction prevention member and protrudes in the axial direction of the introduction prevention member.

4. The intermediate shaft of claim 3, wherein each of the one or more through-holes extends through the connection unit.

5. The intermediate shaft of claim 3, wherein the one or more through-holes is plural through-holes, wherein the plural through-holes are spaced apart from each other in the circumferential direction of the introduction prevention member.

6. The intermediate shaft of claim 3, wherein the one or more through-holes is plural through-holes, wherein an end of each of the plural through-holes is formed with a protrusion that is formed in a circumferential direction of the through-hole and protrudes in an axial direction of the through-hole.

7. The intermediate shaft of claim 3, wherein the one or more through-holes is plural through-holes, wherein a discharge slot is formed in an inside of the connection unit as a circumferential recess to be communicated with the plural through-holes.

8. The intermediate shaft of claim 1, wherein the one or more through-holes is arranged so as to be exposed to an outside of the introduction prevention member.

9. The intermediate shaft of claim 1, wherein an end of each of the through-holes is formed with a protrusion that is formed in a circumferential direction of the through-hole and protrudes in an axial direction of the through-hole.

10. The intermediate shaft of claim 9, wherein a circumferential recess is formed in an inside of each of the through-holes to be communicated with the through-hole.

* * * * *